US010484534B2

United States Patent
Fiorini et al.

(10) Patent No.: US 10,484,534 B2
(45) Date of Patent: Nov. 19, 2019

(54) METHODS OF OPERATING A USER DEVICE IN A USER DEVICE GROUP AND RELATED USER DEVICES AND CONTROL SERVERS

(71) Applicant: Telefonaktiebolaget LM Ericsson (publ), Stockholm (SE)

(72) Inventors: Paolo Fiorini, Mountain View, CA (US); Samy Touati, Pleasanton, CA (US)

(73) Assignee: TELEFONAKTIEBOLAGET LM ERICCSON (PUBL), Stockholm (SE)

( * ) Notice: Subject to any disclaimer, the term of this patent is extended or adjusted under 35 U.S.C. 154(b) by 0 days.

(21) Appl. No.: 16/067,976

(22) PCT Filed: Nov. 18, 2016

(86) PCT No.: PCT/SE2016/051148
§ 371 (c)(1),
(2) Date: Jul. 3, 2018

(87) PCT Pub. No.: WO2017/119830
PCT Pub. Date: Jul. 13, 2017

(65) Prior Publication Data
US 2019/0014208 A1    Jan. 10, 2019

Related U.S. Application Data

(60) Provisional application No. 62/274,531, filed on Jan. 4, 2016.

(51) Int. Cl.
| H04M 3/42 | (2006.01) |
| H04W 88/02 | (2009.01) |
| H04M 1/663 | (2006.01) |
| H04M 1/725 | (2006.01) |
| H04W 68/00 | (2009.01) |
| H04M 1/00 | (2006.01) |

(52) U.S. Cl.
CPC ....... *H04M 3/42263* (2013.01); *H04M 1/663* (2013.01); *H04M 1/72563* (2013.01);
(Continued)

(58) Field of Classification Search
CPC .... H04M 3/42263; H04M 1/663; H04M 3/42; H04M 1/00; H04M 2203/2044;
(Continued)

(56) References Cited

U.S. PATENT DOCUMENTS 7,444,160 B1 * 10/2008 Fournier ............... H04W 76/45
455/518
7,860,485 B2 * 12/2010 Moore .................. H04L 63/061
455/41.2
(Continued)

FOREIGN PATENT DOCUMENTS

KR    20130057299 A    5/2013

*Primary Examiner* — Danh C Le
(74) *Attorney, Agent, or Firm* — Murphy, Bilak & Homiller, PLLC

(57) ABSTRACT

A first user device may be included in a user device group including the first user device and a second user device that share a same service identifier for a communication service. The method may include accepting user input at the first user device to activate an operation mode for the first user device. Responsive to accepting the user input to activate the operation mode at the first user device, the operation mode may be activated at the first user device. Responsive to accepting the user input to activate the operation mode at the first user device, a notification regarding activation of the operation mode may be transmitted to a control server that is remote from the first user device. Related user devices and control servers are also discussed.

17 Claims, 13 Drawing Sheets

(52) U.S. Cl.
CPC ............. *H04M 3/42* (2013.01); *H04W 68/00* (2013.01); *H04W 88/02* (2013.01); *H04W 88/022* (2013.01); *H04M 1/00* (2013.01); *H04M 2203/2044* (2013.01)

(58) Field of Classification Search
CPC . H04M 1/72563; H04W 68/00; H04W 88/02; H04W 88/022
USPC .................................. 455/414.1, 418, 550.1
See application file for complete search history.

(56) References Cited

U.S. PATENT DOCUMENTS

| | | | |
|---|---|---|---|
| 2003/0139175 A1* | 7/2003 | Kim | H04L 69/16 455/419 |
| 2004/0110502 A1 | 6/2004 | Lindqvist et al. | |
| 2006/0063563 A1 | 3/2006 | Kaufman | |
| 2009/0088142 A1 | 4/2009 | Baribault et al. | |
| 2011/0312278 A1* | 12/2011 | Matsushita | H04L 12/40013 455/66.1 |
| 2012/0158943 A1 | 6/2012 | Esteve et al. | |
| 2013/0258953 A1* | 10/2013 | Huang | H04W 72/0406 370/329 |
| 2014/0133363 A1* | 5/2014 | Pritchard | H04M 3/465 370/270 |
| 2014/0281490 A1 | 9/2014 | Prakash et al. | |
| 2015/0133098 A1* | 5/2015 | Warr | H04M 3/436 455/418 |
| 2016/0086218 A1* | 3/2016 | Li | H04L 51/32 705/14.51 |
| 2016/0234213 A1* | 8/2016 | Kim | H04W 4/70 |
| 2017/0257757 A1* | 9/2017 | Huang | H04W 12/02 |

* cited by examiner

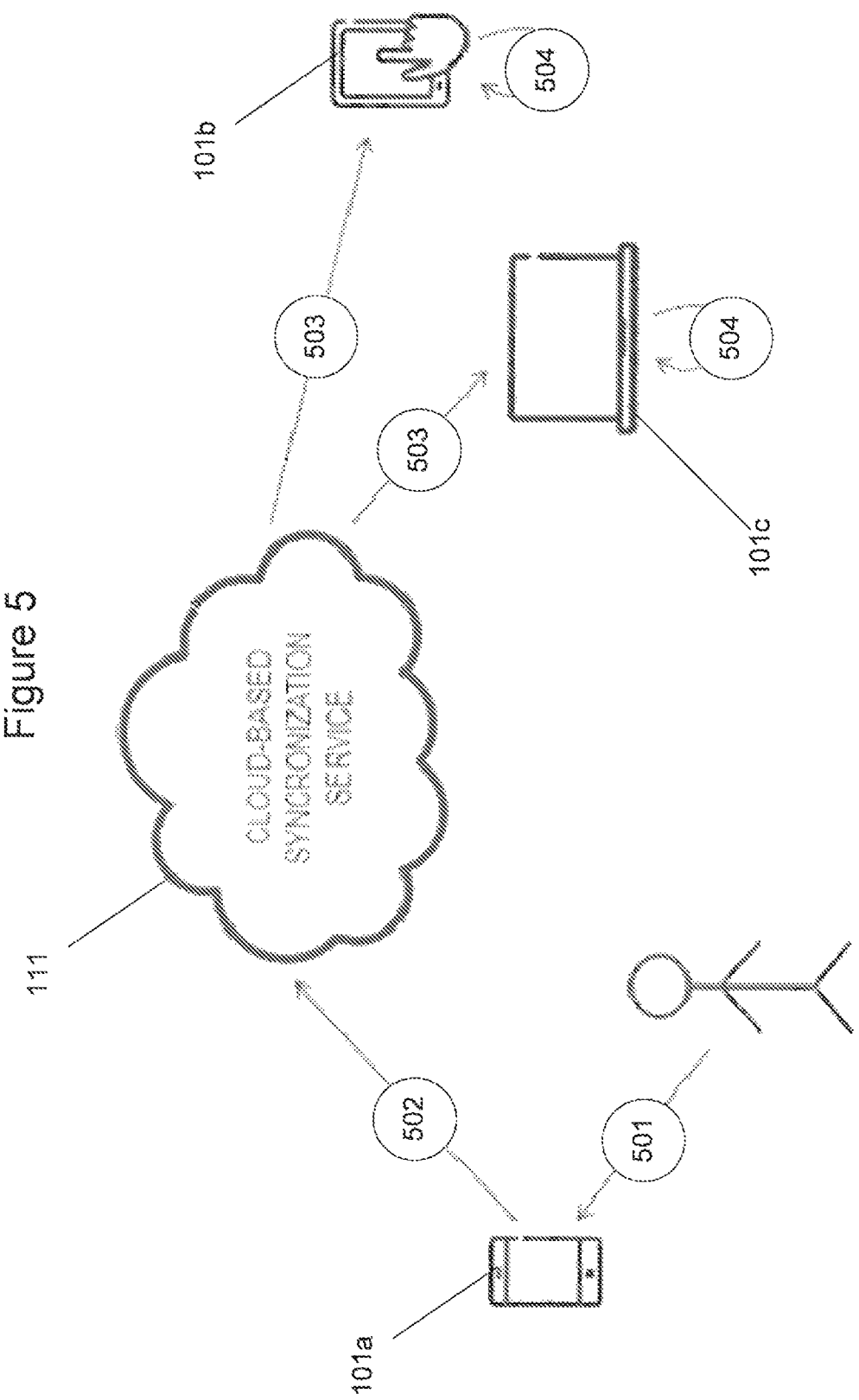

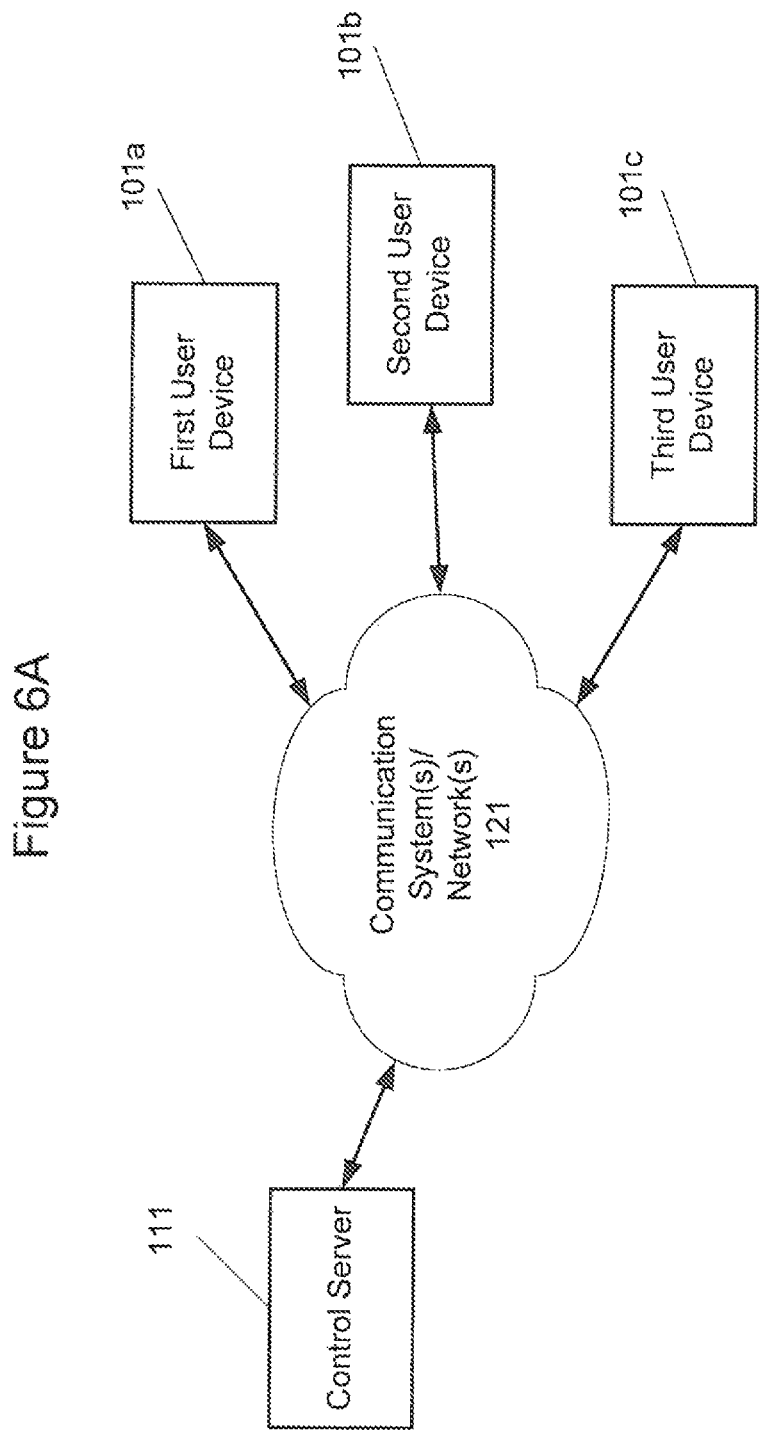

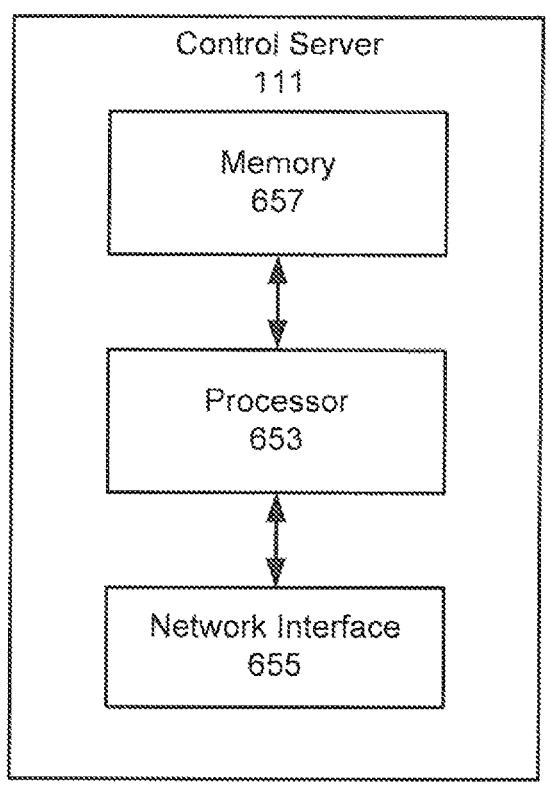

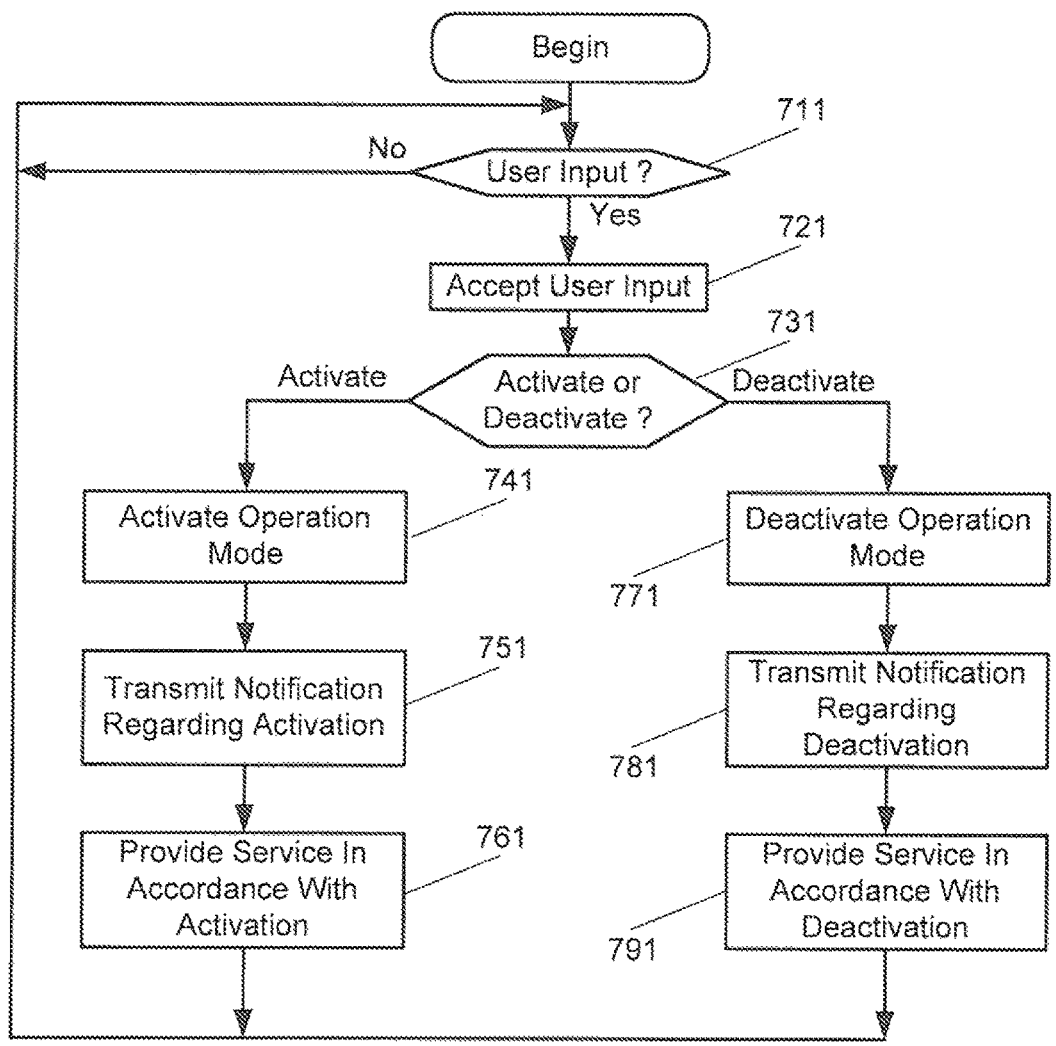

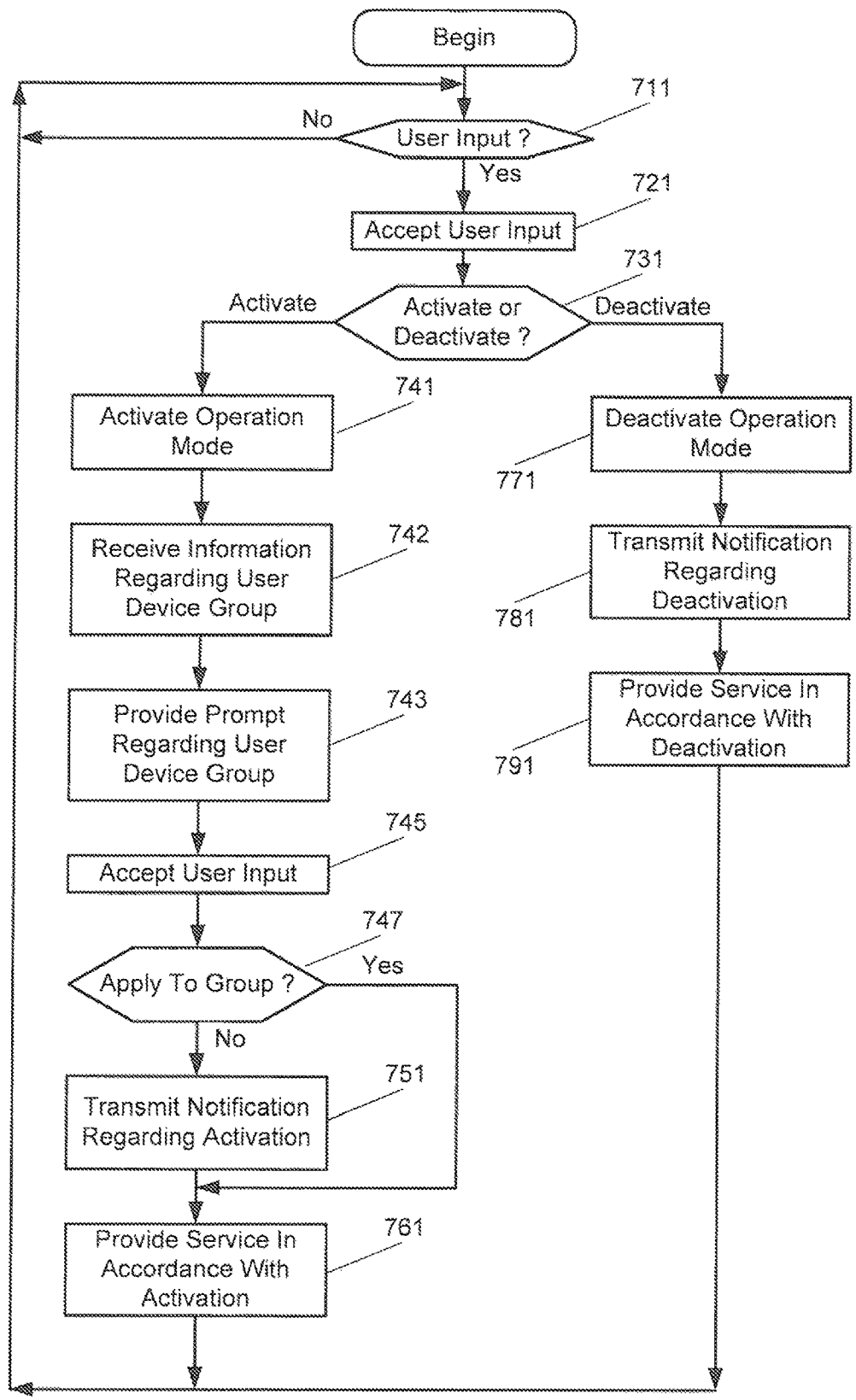

METHODS OF OPERATING A USER DEVICE IN A USER DEVICE GROUP AND RELATED USER DEVICES AND CONTROL SERVERS

TECHNICAL FIELD

The present disclosure relates to electronics, and more particularly, to methods of operating user devices and related user devices and control servers.

BACKGROUND

There is an increasing demand for communication services that are flexibly usable across multiple user devices of diverse types. For example, multiple solutions exist to provide that voice and/or video calls to a specific service identifier (e.g., MSISDN, email address, etc.) are directed toward multiple user devices registered for the service by the same user that owns that identifier, so that the user can decide from which specific device he/she wants to pick-up the call at his/her convenience.

One example is the recent popularity of multi-device support with over-the-top services such as Skype or FaceTime. Another example is the large number of service providers worldwide that have started to offer Wi-Fi calling service with support for multiple devices.

The types of devices relevant in this context may include smartphones, tablet computers, laptop computers, desktop computers, set-top-boxes, gaming consoles, etc., including both devices equipped with an SIM card and devices not equipped with an SIM card.

With calls for one user being directed to multiple devices for that user, however, it may be difficult for the user to manage operation of the multiple devices.

SUMMARY

According to some embodiments of inventive concepts, a method may be provided to operate a first user device included in a user device group including the first user device and a second user device that share a same service identifier for a communication service. The method may include accepting user input at the first user device to activate an operation mode for the first user device. Responsive to accepting the user input to activate the operation mode at the first user device, the operation mode may be activated at the first user device. Responsive to accepting the user input to activate the operation mode at the first user device, a notification regarding activation of the operation mode may be transmitted to a control server that is remote from the first user device.

The operation mode may be a silent operation mode. Moreover, activating the silent operation mode may include disabling audible alerts for the first user device, enabling a do not disturb mode for the first user device, and/or de-registering the first user device from an IP multimedia subsystem core.

After activating the operation mode, user input may be accepted at the first user device to deactivate the operation mode for the first user device. Responsive to accepting the user input to deactivate the operation mode at the first user device, the operation mode may be deactivated at the first user device. Responsive to accepting the user input to deactivate the operation mode at the first user device, a notification regarding deactivation of the operation mode may be transmitted to the control server that is remote from the first user device.

Responsive to accepting the user input to activate the operation mode, a prompt for user input regarding activation of the operation mode at the second user device of the user device group may be provided. User input to activate the operation mode may be accepted at the second user device of the user device group. Moreover, transmitting the notification regarding activation may include transmitting the notification regarding activation responsive to accepting the user input to activate the operation mode at the first user device and responsive to accepting the user input to activate the operation mode at the second user device.

Before providing the prompt including the first prompt for the second user device and the second prompt for the third user device, information regarding the second user device and the third user device may be received from the control server. Providing the prompt including the first prompt and the second prompt may include providing the first and second prompts responsive to receiving the information regarding the second and third user devices.

The operation mode may be a silent operation mode. After activating the silent operation mode, a voice and/or video call may be received at the first user device without providing an audible alert.

Receiving the voice and/or video call may include receiving a first voice and/or video call. After activating the silent operation mode and after accepting the first voice and/or video call, user input may be accepted at the first user device to deactivate the silent operation mode for the first user device. Responsive to accepting the user input to deactivate the silent operation mode at the first user device, the silent operation mode may be deactivated at the first user device. Responsive to accepting the user input to deactivate the silent operation mode at the first user device, a notification regarding deactivation of the silent operation mode may be transmitted to the control server that is remote from the first user device. After deactivating the silent operation mode, an audible alert may be provided at the first user device for a second voice and/or video call received at the first user device.

According to some other embodiments of inventive concepts, a first user device may be provided wherein the first user device is a user device of a user device group including the first user device and a second user device that share a same service identifier for a communication service. The first user device may include a communication interface configured to provide communications over a network, a user interface configured to accept user input from a user of the first user device, and a processor coupled with the communication interface and the user interface. The processor may be configured to transmit communications through the communication interface to the network and to receive communications through the communication interface from the network, and the processor may be configured to receive user input accepted through the user interface. The processor may be configured to accept user input at the first user device to activate an operation mode for the first user device, and to activate the operation mode at the first user device responsive to accepting the user input to activate the operation mode at the first user device. The processor may also be configured to transmit a notification regarding activation of the operation mode to a control server that is remote from the first user device responsive to accepting the user input to activate the operation mode at the first user device.

The operation mode may be a silent operation mode. Activating the silent operation mode may include disabling audible alerts for the first user device, enabling a do not disturb mode for the first user device, and/or de-registering the first user device from an IP multimedia subsystem core.

The processor may be further configured to accept user input at the first user device to deactivate the operation mode for the first user device after activating the operation mode, and to deactivate the operation mode at the first user device responsive to accepting the user input to deactivate the operation mode at the first user device. In addition, the processor may be configured to transmit a notification regarding deactivation of the operation mode to the control server that is remote from the first user device responsive to accepting the user input to deactivate the operation mode at the first user device.

The processor may be further configured to provide a prompt for user input regarding activation of the operation mode at the second user device of the user device group responsive to accepting the user input to activate the operation mode. In addition, the processor may be configured to accept user input to activate the operation mode at the second user device of the user device group. Moreover, transmitting the notification regarding activation may include transmitting the notification regarding activation responsive to accepting the user input to activate the operation mode at the first user device and responsive to accepting the user input to activate the operation mode at the second user device.

The processor may also be configured to receive information regarding the second user device and the third user device from the control server before providing the prompt including the first prompt for the second user device and the second prompt for the third user device. Providing the prompt including the first prompt and the second prompt may include providing the first and second prompts responsive to receiving the information regarding the second and third user devices.

The operation mode may be a silent operation mode. In addition, the processor may be further configured to receive a voice and/or video call at the first user device without providing an audible alert after activating the silent operation mode.

Receiving the voice and/or video call may include receiving a first voice and/or video call. The processor may further be configured to accept user input at the first user device to deactivate the silent operation mode for the first user device after activating the silent operation mode and after accepting the first voice and/or video call, and to deactivate the silent operation mode at the first user device responsive to accepting the user input to deactivate the silent operation mode at the first user device. In addition, the processor may be configured to transmit a notification regarding deactivation of the silent operation mode to the control server that is remote from the first user device responsive to accepting the user input to deactivate the silent operation mode at the first user device, and to provide an audible alert at the first user device for a second voice and/or video call received at the first user device after deactivating the silent operation mode.

According to still other embodiments of inventive concepts, a first user device of a user device group may include the first user device and a second user device that share a same service identifier for a communication service. The first user device may be adapted to accept user input at the first user device to activate an operation mode for the first user device, and to activate the operation mode at the first user device responsive to accepting the user input to activate the operation mode at the first user device. The first user device may also be adapted to transmit a notification regarding activation of the operation mode to a control server that is remote from the first user device responsive to accepting the user input to activate the operation mode at the first user device.

The operation mode may be a silent operation mode. Activating the silent operation mode may include disabling audible alerts for the first user device, enabling a do not disturb mode for the first user device, and/or de-registering the first user device from an IP multimedia subsystem core.

The first user device may be further adapted to accept user input at the first user device to deactivate the operation mode for the first user device after activating the operation mode, and to deactivate the operation mode at the first user device responsive to accepting the user input to deactivate the operation mode at the first user device. The first user device may also be adapted to transmit a notification regarding deactivation of the operation mode to the control server that is remote from the first user device responsive to accepting the user input to deactivate the operation mode at the first user device.

The first user device may be further adapted to provide a prompt for user input regarding activation of the operation mode at the second user device of the user device group responsive to accepting the user input to activate the operation mode, and to accept user input to activate the operation mode at the second user device of the user device group. Transmitting the notification regarding activation may include transmitting the notification regarding activation responsive to accepting the user input to activate the operation mode at the first user device and responsive to accepting the user input to activate the operation mode at the second user device.

The first user device may be further adapted to receive information regarding the second user device and the third user device from the control server before providing the prompt including the first prompt for the second user device and the second prompt for the third user device. Providing the prompt including the first prompt and the second prompt may include providing the first and second prompts responsive to receiving the information regarding the second and third user devices.

The operation mode may be a silent operation mode. The first user device may be further adapted to receive a voice and/or video call at the first user device without providing an audible alert after activating the silent operation mode.

Receiving the voice and/or video call may include receiving a first voice and/or video call. The first user device may be further adapted to accept user input at the first user device to deactivate the silent operation mode for the first user device after activating the silent operation mode and after accepting the first voice and/or video call. The first user device may also be adapted to deactivate the silent operation mode at the first user device responsive to accepting the user input to deactivate the silent operation mode at the first user device, and to transmit a notification regarding deactivation of the silent operation mode to the control server that is remote from the first user device responsive to accepting the user input to deactivate the silent operation mode at the first user device. In addition, the first user device may be adapted to provide an audible alert at the first user device for a second voice and/or video call received at the first user device after deactivating the silent operation mode.

According to yet other embodiments of inventive concepts, a method may be provided to operate a control server providing service for a user device group including a first user device and a second user device sharing a same service identifier for a communication service. The first user device and the second user device may be remote from the control server. The method may include receiving a first notification from the first user device regarding activation of an operation mode at the first user device, and responsive to receiving the first notification from the first user device, transmitting a second notification to the second user device regarding activation of the operation mode for the second user device.

The operation mode may be a silent operation mode to disable audible alerts for the first user device, to enable a do not disturb mode for the first user device, and/or to de-register the first user device from an IP multimedia subsystem core.

The user device group may include the first user device, the second user device, and a third user device all sharing the service identifier for the communication service. Responsive to receiving the first notification, a third notification regarding activation of the operation mode at the third user device of the user device group may be transmitted.

Before receiving the first notification from the first user device, information regarding the second user device and the third user device may be transmitted to the first user device.

After transmitting the second notification, a third notification may be received from the first user device regarding deactivation of the operation mode at the first user device. Responsive to receiving the third notification from the first user device, a fourth notification may be transmitted to the second user device regarding deactivation of the operation mode for the second user device.

According to more embodiments of inventive concepts, a control server may provide service for a user device group including a first user device and a second user device that share a same service identifier for a communication service. The control server may include a network interface configured to provide communications over a network, and a processor coupled with the network interface. The processor may be configured to transmit and receive communications over the network through the network interface. The processor may be configured to receive a first notification from the first user device regarding activation of an operation mode at the first user device. The processor may also be configured to transmit a second notification to the second user device regarding activation of the operation mode for the second user device responsive to receiving the first notification from the first user device.

The operation mode may be a silent operation mode to disable audible alerts for the first user device, to enable a do not disturb mode for the first user device, and/or to de-register the first user device from an IP multimedia subsystem core.

The user device group may include the first user device, the second user device, and a third user device all sharing the service identifier for the communication service. The processor may be further configured to transmit a third notification regarding activation of the operation mode at the third user device of the user device group responsive to receiving the first notification.

The processor may be further configured to transmit information regarding the second user device and the third user device to the first user device before receiving the first notification from the first user device.

The processor may be further configured to receive a third notification from the first user device regarding deactivation of the operation mode at the first user device after transmitting the second notification. The processor may also be configured to transmit a fourth notification to the second user device regarding deactivation of the operation mode for the second user device responsive to receiving the third notification from the first user device.

According to further embodiments of inventive concepts, a control server may provide service for a user device group including a first user device and a second user device that share a same service identifier for a communication service. The control server may be adapted to receive a first notification from the first user device regarding activation of an operation mode at the first user device, and to transmit a second notification to the second user device regarding activation of the operation mode for the second user device responsive to receiving the first notification from the first user device.

The operation mode may be a silent operation mode to disable audible alerts for the first user device, to enable a do not disturb mode for the first user device, and/or to de-register the first user device from an IP multimedia subsystem core.

The user device group may include the first user device, the second user device, and a third user device all sharing the service identifier for the communication service. The control server may be further adapted to transmit a third notification regarding activation of the operation mode at the third user device of the user device group responsive to receiving the first notification.

The control server may be further adapted to transmit information regarding the second user device and the third user device to the first user device before receiving the first notification from the first user device.

The control server may also be adapted to receive a third notification from the first user device regarding deactivation of the operation mode at the first user device after transmitting the second notification. The control server may also be adapted to transmit a fourth notification to the second user device regarding deactivation of the operation mode for the second user device responsive to receiving the third notification from the first user device.

According to some embodiments disclosed herein, an operation mode of one user device may be propagated efficiently to other user devices of a same user device group to provide synchronization between devices of the user device group. Moreover, by using a control server to support such synchronization, the control server may maintain a continuously updated view/record of operational modes at individual devices of the user device group. A user may thus be able to more easily/efficiently manage multiple user devices of a user device group.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 5 is a schematic diagram illustrating multiple device silent operation mode using cloud synchronization according to some embodiments of inventive concepts;

FIG. 6A is a block diagram illustrating a plurality of user devices and a control server coupled over a communication system(s)/network(s) supporting silent operation mode according to some embodiments of inventive concepts;

FIG. 6C is a block diagram illustrating elements of a control server of FIG. 6A according to some embodiments of inventive concepts;

FIG. 7A is a flow diagram illustrating operations of a user device and FIG. 9A is a related module diagram according to some embodiments of inventive concepts;

FIG. 7B is a flow diagram illustrating operations of a user device and FIG. 9B is a related module diagram according to some embodiments of inventive concepts.

DETAILED DESCRIPTION OF EMBODIMENTS

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

FIG. 6A is a schematic diagram illustrating first, second, and third user devices 101a, 101b, and 101c under control of a same user wherein first, second, and third user devices 101a, 101b, and 101c are configured for communication over communication system(s)/network(s) 121 (also referred to as a network). By way of example, each of user devices 101a, 101b, and 101c may be a smartphone, a tablet computer, a laptop computer, a desktop computer, etc., and each of user devices 101a, 101b, and 101c may be configured to support network communication via a wired (e.g., Local Area Network) and/or wireless (cellular radio access network RAN, wireless local area network WLAN, WiFi, etc.) interface. Moreover, network 121 may include one or more of a cellular radio access network RAN, wireless local area network WLAN, wired local area network LAN, the Internet, etc. Moreover, user devices 101a, 101b, and 101c may support a group operation mode/modes (e.g., group silent operation mode) that is supported by control server 111 so that a group operation mode that is selected/activated at one of user device of the group may be selected/activated at the other user devices of the group. While three user devices 101a, 101b, and 101c are discussed herein by way of example, a user device group according to embodiments of inventive concepts may include any number of two, three, or more user devices.

Figure 6B:
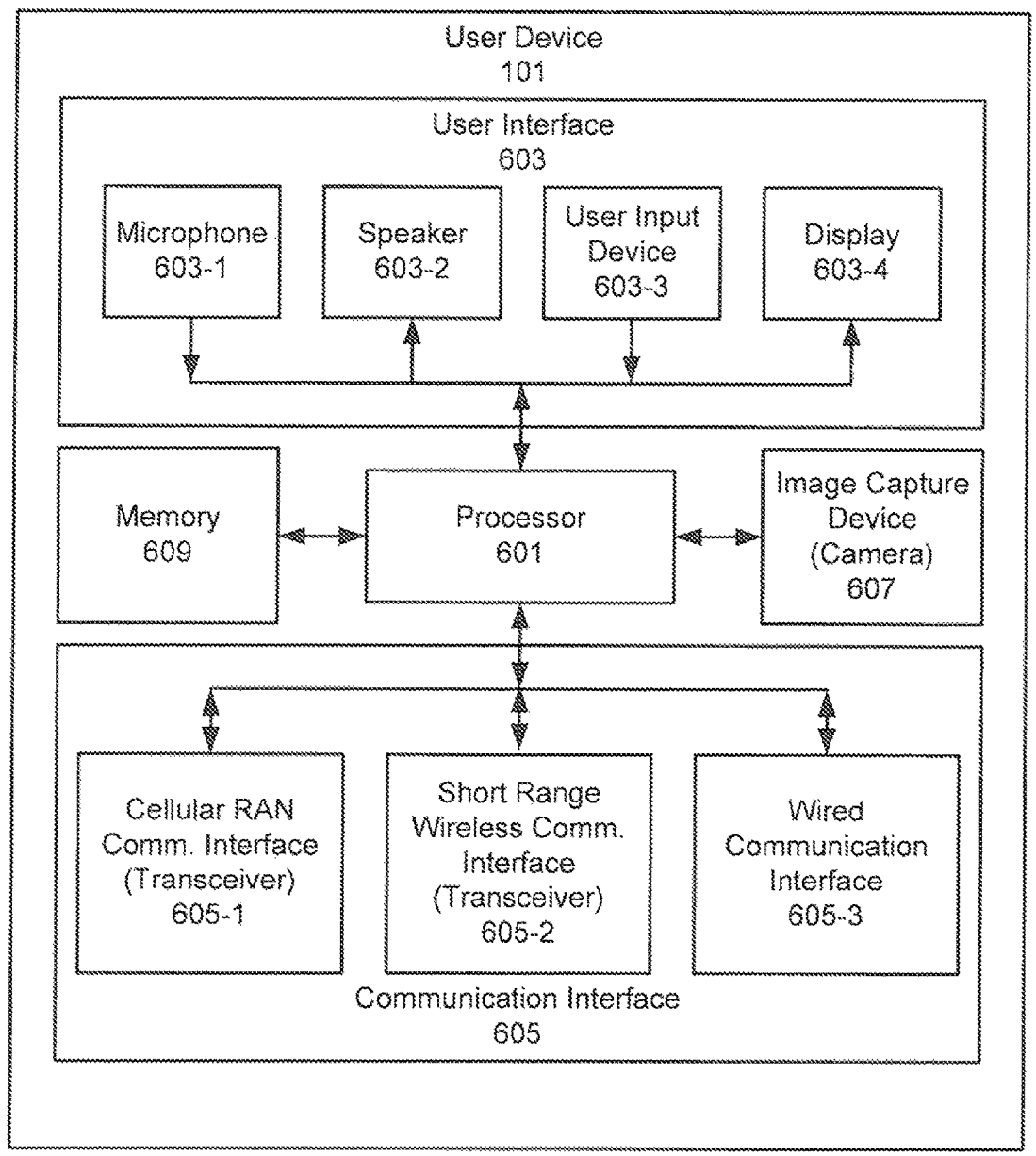
FIG. 6B is a block diagram illustrating elements of a user device of FIG. 6A according to some embodiments of inventive concepts.

FIG. 6B is a block diagram illustrating a user device 101 (e.g., user device 101a, 101b, or 101c) of FIG. 6A according to some embodiments. As shown, user device 101 may include processor 601 coupled with user interface 603, communication interface 605, and memory 609. In addition, user device may include image capture device (e.g., a camera) 607 coupled with processor 601. As shown, user interface may include one or more of microphone 603-1, speaker 603-2, user input device 603-3, and/or display 603-4. User input device may include a keypad, keyboard, mouse, trackball, button(s), etc., and/or display 603-4 and portions of user input device 603-3 may be integrated in a touch sensitive screen. Communication interface may include one or more of a cellular radio access network (RAN) interface (also referred to as a RAN transceiver), a short range wireless communication interface (e.g., a Near Field Communication NFC transceiver, a BlueTooth transceiver, an infrared IR transceiver, a WiFi transceiver, etc.), and/or a wired network communication interface. User device 600 can thus provide communication through network(s) 121 using communication interface 605 (e.g., using one or more of cellular RAN communication interface 605-1, short range wireless communication interface 605-2, and/or wired communication interface 605-3). In addition, user device 600 may be configured to communicate with one or more other user devices directly (without using network(s) 121) using one or more elements of communication interface (e.g., using short range communication interface 605-2 and/or wired communication interface 605-3).

Processor 601 (also referred to as a processor circuit or processing circuitry) may include one or more data processing circuits, such as a general purpose and/or special purpose processor (e.g., microprocessor and/or digital signal processor). Processor 601 may be configured to execute computer program instructions from functional modules in memory 609 (also referred to as a memory circuit or memory circuitry), described below as a computer readable medium, to perform some or all of the operations and methods that are described herein for one or more of the embodiments. Moreover, processor 601 may be defined to include memory so that separate memory 609 may not be required.

When a structure of a particular user device (i.e., user device 101a, user device 101b, or user device 101c) is described, "a", "b", or "c" may be respectively added to the reference number to designate the particular device. User device 101a, for example, may be discussed as including processor 601a, user interface 603a (e.g., including one or more of microphone 603-1a, speaker 603-2a, user input device 603-3a, and/or display 603-4a), communication interface 605a (including one or more of cellular RAN interface 605-1a, short range communication interface 605-2a, and/or wired communication interface 605-3a), image capture device 607a, and memory 609a. Similarly, user device 101b, for example, may be discussed as including processor 600b, user interface 603b (e.g., including one or more of microphone 603-1b, speaker 603-2b, user input device 603-3b, and/or display 603-4b), communication interface 605b (including one or more of cellular RAN interface 605-1b, short range communication interface 605-2b, and/or wired communication interface 605-3b), image capture device 607b, and memory 609b.

FIG. 6C is a block diagram illustrating a control server 111 of FIG. 6A according to some embodiments of inventive concepts. As shown, server 111 may include processor 653 coupled with network interface 655, and memory 657. Server 111 may thus provide communication through network(s) 121 using network interface 655. Processor 653 (also referred to as a processor circuit or processing circuitry) may include one or more data processing circuits, such as a general purpose and/or special purpose processor (e.g., microprocessor and/or digital signal processor). Processor 653 may be configured to execute computer program instructions from functional modules in memory 657 (also referred to as a memory circuit or memory circuitry), described below as a computer readable medium, to perform some or all of the operations and methods that are described herein for one or more of the embodiments. Moreover, processor 653 may be defined to include memory so that separate memory 657 may not be required.

Services may be provided that direct a call to multiple user devices. After initial excitement about the possibility to have each individual call directed to multiple devices and to flexibly pick up each call form a most convenient one of those devices, however, users may rapidly perceive such a service as an annoyance if there is no effective way to switch all of the device to the silent operation mode at once. For example, when going to bed at night, a user may need to follow one of the following two options:

Interact with each individual device to activate the silent operation mode on a per device basis; or Interact with one of the devices to put that specific device in silent operation mode and to disable the multi-device capability (thus preventing calls from reaching other devices).

Neither of these options, however, may be effective or appealing. The first option may involve inconvenient interactions with multiple devices. The second option may be counter-intuitive for the user (disabling the service rather than silencing devices), expensive for the network (service activation/deactivation generally involves multiple network configuration operations) and/or impractical if the reactivation involves entering user credentials or acknowledging notifications.

Proposed solutions according to some embodiments of inventive concepts may include offering the user the possibility to control the silent operation mode across all of his/her devices as a single operation from any one of the devices.

As an example, the user may pick any of his/her devices and toggle a software switch which activates or deactivates silent operation mode. The user interface may proactively offer the option to either execute the action on the specific device or "propagate" it to other devices belonging to the same user.

In this manner, the user may be effectively empowered to activate/deactivate the silent operation mode either on a device by device basis or on a global basis.

Moreover, activation and deactivation may be executed with the same scope or with different scope. For example, a user may activate the silent operation mode on all his/her devices at once, and then deactivate silent operation mode only for one specific device (leaving the silent operation mode activated for the other devices).

According to some embodiments of inventive concepts, usability of communication services where a single call may be directed to multiple devices may be improved. Accordingly, an emerging (and still unarticulated) user need that communication device vendors may have to face may be addressed according to some embodiments of inventive concepts.

Figure 1:
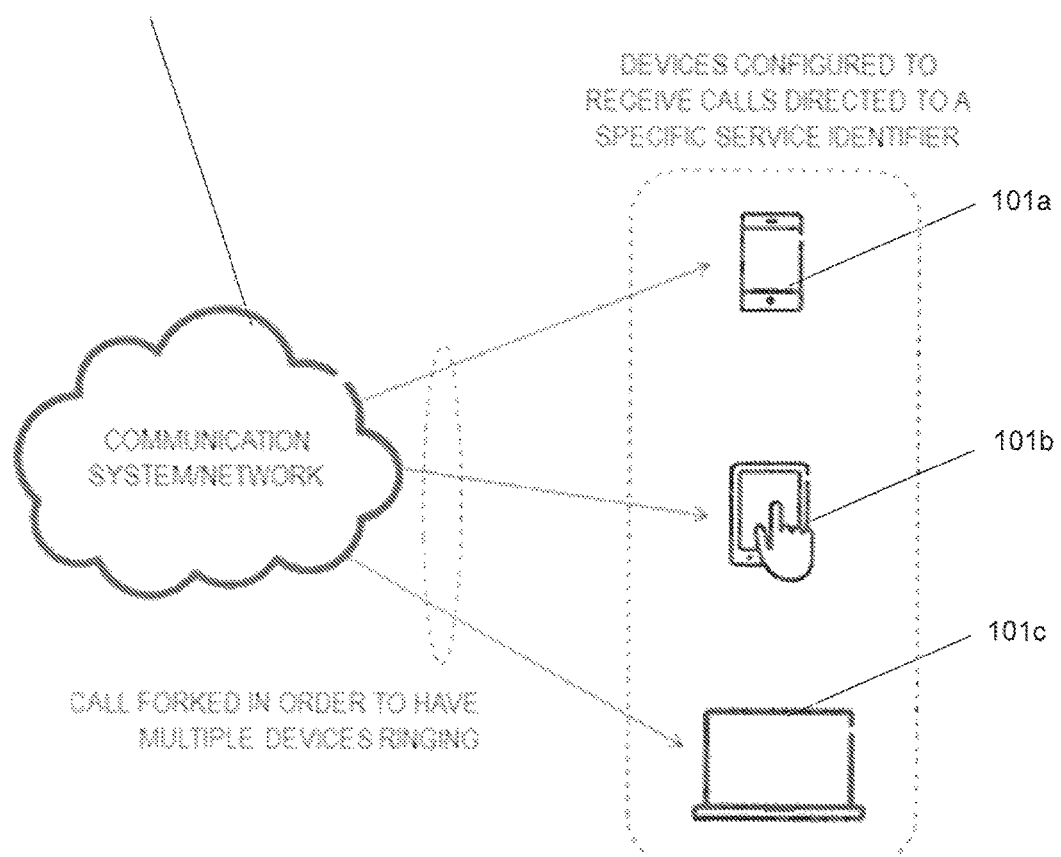
FIG. 1 is a schematic diagram illustrating a plurality of user devices coupled over a communication system(s)/network(s) supporting reception of a call at multiple user devices sharing a service identifier.

As illustrated in FIG. 1, embodiments of inventive concepts may be relevant for cases in which a single call (e.g., voice, video, messaging, etc.) may be directed to multiple devices configured by a same user to share one or more service identifiers (e.g. MSISDNs, email addresses, etc.). As shown in FIG. 1, network 111 may forward a single call to each of user devices 111*a*, 111*b*, and 111*c* of a user device group belonging to a same user and using a same service identifier.

Figure 2:
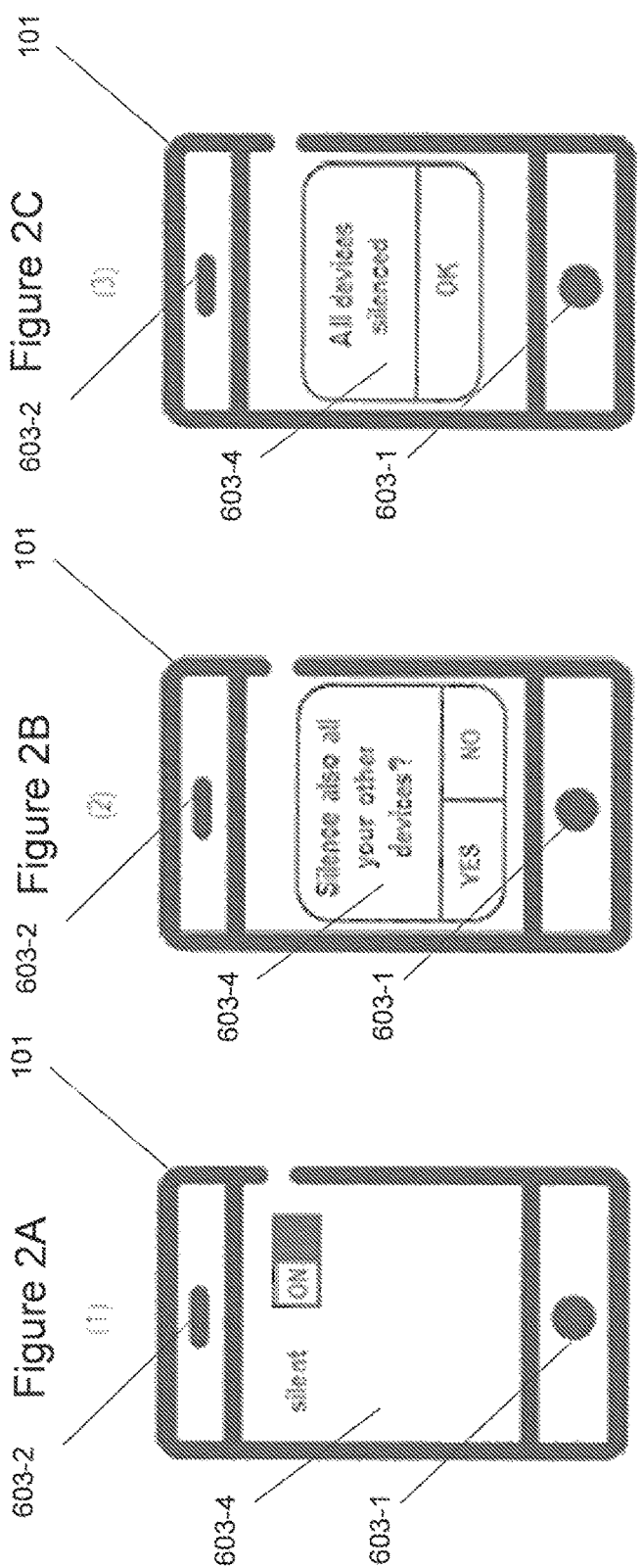
FIGS. 2A-C are schematic diagrams illustrating a silent operation mode according to some embodiments of inventive concepts.

FIGS. 2A, 2B, and 2C illustrate an example of a user interface (provided on a touch sensitive display 603-4) that may offer the possibility to extend the scope of the silent operation mode control from one individual device to all user devices configured by/for the user. The example of FIGS. 2A-C illustrates activation of the silent operation mode. Deactivation of the silent operation mode may follow the same course. Also, FIGS. 2A-C are provided for illustrative purposes. A multitude of other similar designs/layouts may be possible for the user interface according to other embodiments of inventive concepts. The multi-device silent operation mode control could also come in the form of a dedicated hardware switch.

As shown in FIG. 2A, the user may activate the silent operation mode on one user device 101 (e.g., user device 101*a*), for example, using a graphical user interface (GUI) slide button. Responsive to receiving activation of the silent operation mode, the user device 101 may provide an option through touch sensitive display 603-4 to extend the silent operation mode to other user devices of the user device group sharing the same service identification as shown in FIG. 2B. If the user selects the "No" option, the silent operation mode may be applied to only the one user device (e.g., user device 101*a*) without applying the silent operation mode to other user devices of the user device group (e.g., user devices 101*b* and 101*c*). If the user selects the "Yes" option of FIG. 2B, the user device 101 may request confirmation that all user devices of the user device group should be silenced as shown in FIG. 2C, and responsive to user input selecting "OK", the user device 101 (e.g., user device 101*a*) may transmit an instruction/notification to control server 111 requesting that the silent operation mode be applied to all user devices (e.g., user devices 101*b* and 101*c*) of the user device group.

Figure 3:
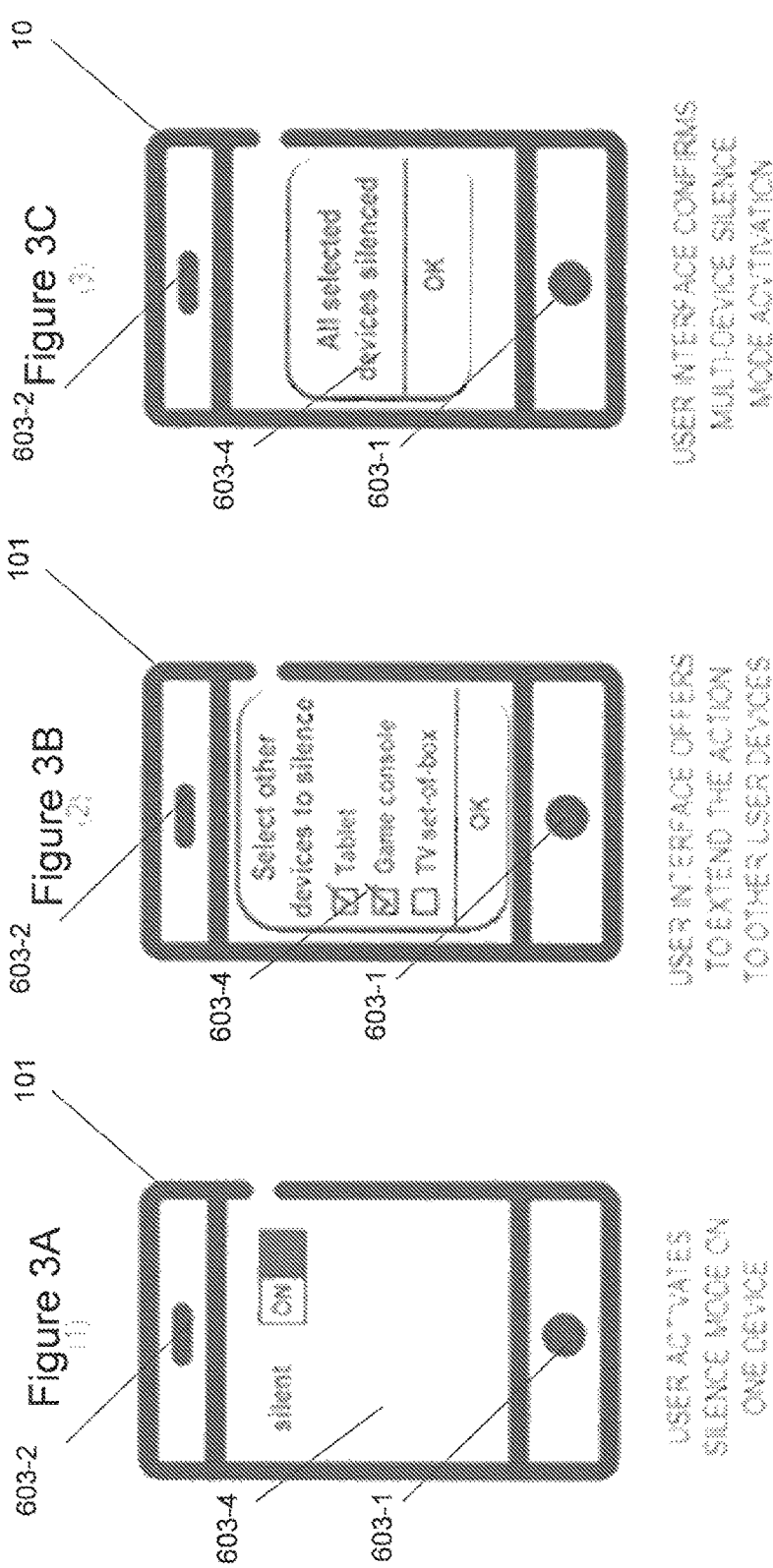
FIGS. 3A-C are schematic diagrams illustrating a silent operation mode according to some other embodiments of inventive concepts.

FIGS. 3A, 3B, and 3C illustrate an additional example of a user interface used for silent operation mode. In this case the user is offered the possibility to select a specific set of devices (from the user device group) to which the requested silent operation mode action should propagate. FIGS. 3A-C are intended to illustrate a possibility to optionally pick and choose a subset of remote devices of the user device group rather than including all the remote devices of the user device group in the same action.

FIG. 3A illustrates selection of the silent operation mode which is the same as discussed above with respect to FIG. 2A. Responsive to silent operation mode selection, user device 101 (e.g., user device 101A) may provide a menu identifying the other user devices of the user device group on display 603-4 allowing the user to select a subset of the other user devices as shown in FIG. 3B. Responsive to user input selecting the subset of user devices and selecting "OK" as shown in FIG. 3B, user device 101 may request confirmation that the selected user devices of the user device group should be silenced as shown in FIG. 3C, and responsive to user input selecting "OK", the user device 101 (e.g., user device 101*a*) may transmit an instruction/notification to control server 111 requesting that the silent operation mode be applied to the indicated user devices (of FIG. 3B) of the user device group.

Multiple different implementations are possible to support the multi-device silent operation mode. Two examples such implementations are described below according to some embodiments of inventive concepts.

Figure 4:
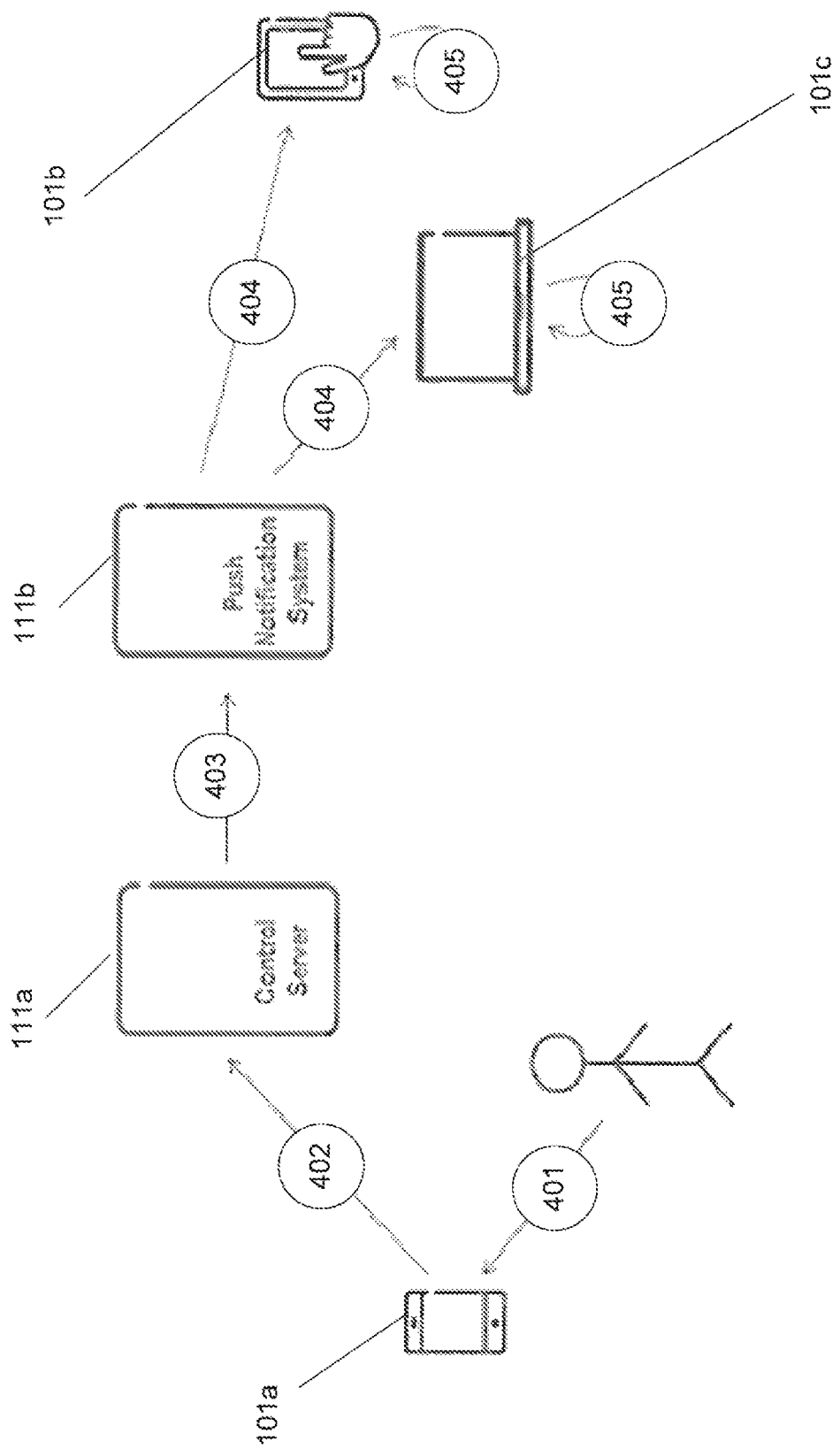
FIG. 4 is a schematic diagram illustrating multiple device silent operation mode using push notifications according to some embodiments of inventive concepts.

FIG. 4 illustrates support of multi-device silent operation mode features based on control through push notifications. According to some embodiments, the following operations may be used:

- 401. The user activates or deactivates the silent operation mode on user device 101a and requests the propagation of the same action (to activate/deactivate the silent operation mode) to all other user devices of his/her user device group (e.g., as discussed above with respect to FIGS. 2A-C) or to a subset of other user devices of his/her user device group (e.g., as discussed above with respect to FIGS. 3A-C).
- 402. User device 101a interacts with control server 111a that maintains information about all the user devices configured by the user (e.g., user devices of the user's user device group). In general, control server 111a may be an element of a system that supports the communication services for the user devices of the user device group. However, control server 111a could instead be a server dedicated to the multi-device silent operation mode function.
- 403. Control server 111a may identify the additional user devices to which the activation/deactivation action should propagate. Control server 111a may interact with the push notification system 111b relevant for those devices to have a push notification dispatched to each target user device of the user device group. Examples of push notification systems may include Apple APNS, Google GCM, and Microsoft WNS. In general, the interaction indicated as operation 403 of FIG. 4 may be a single interaction with a single push notification system or multiple interactions (e.g., one interaction per target user device) with one or more different push notification systems. This depends on the type of the target user devices and on the features of their associated push notification systems. As shown in FIG. 4, control server 111a and push notification system/systems 111b may be provided separately, for example, with each being provided using a separate server having a structure such as that illustrated in FIG. 6C. According to some other embodiments a single server 111 may perform operations of both control server 111a and push notification system 111b.
- 404. The push notification system/systems 111b delivers the push notifications to the target user devices (e.g., user devices 101b and 101c). Each push notification specifies whether the requested action is to activate or deactivate the silent operation mode. The notification may also include further instructions to direct the user device behavior, such as indications on how silencing should be actually achieved and/or indications on whether the user device should inform the control server once it has completed the requested action.
- 405. Each user device 101b and 101c receives and processes the push notification and acts according to the specified action and instructions. For example, if the push notification indicates that the user device should go to silent operation mode, then the user device locally activates the silent operation mode.

The local activation of the silent operation mode may materialize in the form of a purely local action at the user device (such as disabling all ringing alerts), enabling a Do Not Disturb mode, and/or de-registration from the IMS core.

Control server 111a is responsible to process the silent operation mode activation/deactivation requests received from the various user devices of the user device group, and to propagate the requests to other devices via push notifications to achieve the user's intent. For this purpose, control server 111a may have knowledge of the set of user devices of the user device group that the user has configured with shared service identifiers.

If the possibility to pick and choose the subset of remote user devices to be silenced/un-silenced is supported (e.g., as shown in FIGS. 3A-C), then the user device on which the user initiates the action should have the capability to query control server 111a for the list of remote user devices (of the user device group) to be presented to the user (e.g., as shown in FIG. 3B), and control server 111a should have the capability to answer that type of query.

Control server 111a may also continuously keep track of which specific user devices have activated/deactivated the silent operation mode. For this purpose, each user device that changes its silent operation mode status should have the capability to report the change to control server 111a, and control server 111a should have the capability to receive that type of report. With these capabilities in place, the user experience may be enriched by offering the possibility to provide a visual representation of the silent operation mode status of all user devices of the user device group at any individual device of that group.

FIG. 5 illustrates support of the multi-device silent operation mode features using cloud-based synchronization services, e.g., using a control server 111 in the cloud. All the user devices of the user device group configured by the user are assumed to be members of the same cloud-based synchronization service, which in turn is assumed to have the capability to synchronize in near real-time files or variable values/objects across all the member devices belonging to a same user (i.e., all user devices of the user device group). The following operations may be involved:

- 501. The user activates or deactivates the silent operation mode on user device 101a and requests the propagation of the same action to all other of his/her other user devices of the user device group or to a subset of his/her other user devices of the user device group.
- 502. User device 101a locally updates a variable or file which is subject to synchronization across the set of user devices 101b and 101c belonging to the same user (i.e., the user device group). For example, user device 101a changes a local flag from FALSE to TRUE (or vice versa) and the change triggers the synchronization through the cloud-based service to other user devices 101b and 101c of the user device group.
- 503. The other user devices 101b and 101c configured by the user receive the change through the cloud-based synchronization service including control server 111.
- 504. Each user device 101a, 101b, and 101c processes the change and acts accordingly. For example, the change may come in the form of a silent operation mode status flag modified from FALSE to TRUE, which in turn triggers the user device to locally activate the silent operation mode.

A single TRUE/FALSE flag synchronized across all the devices may be sufficient to convey the user intent in case the multi-device silent operation mode is offered so that the requested action can propagate to either all or none of the remote devices. More complex data structures may be needed in case the user is empowered to pick and choose a subset of remote user devices to which the action should propagate.

While methods and devices have been described herein for multi-device control of the silent operation mode, such methods and/or devices may also be used for other operation modes that may be relevant in multi-device scenarios according to other embodiments of inventive concepts.

As an example, the same/similar methods and/or mechanisms can be used for the activation/deactivation of call forwarding on multiple devices at once. As another example, the same methods and/or mechanisms can be used to support the concurrent configuration and cancellation of an alarm clock on multiple devices at once, just in case the user wants to be sure not to miss it. While embodiments of inventive concepts are discussed by way of example with respect to a silent operation mode, a call forwarding operation mode, and an alarm clock operation mode, embodiments of inventive concepts may be used for other operation modes.

According to some embodiments of inventive concepts, activation and deactivation of a silent operation mode for a user device group may be controlled from one user device of the user device group. Such control may be exercised from any of the devices of the group, and remote activation of the silent operation mode on a remote user device of the group may be achieved without disabling the remote user device. According to some embodiments, the silent operation mode may be activated/deactivated with flexibility with different scope in terms of affected devices. According to some embodiments, silent operation mode may be activated at once on all user devices of a user device group associated with a same user, and then silent operation mode may be selectively deactivated on a device by device basis. User interface features may be provided that proactively offer the option to propagate the activation or deactivation of the silent operation mode to other devices when activating or deactivating the silent operation mode on a specific device (e.g., as shown in FIGS. 2A-B and 3A-B).

The multi-device silent operation mode may be supported in a manner that is a single-click extension of the silent operation mode control for a single device, and the user may pick and choose the subset of remote devices to which the requested action should propagate. For example, the option to select silent/un-silent operation modes may be selected for a subset of devices as opposed to requiring selection of all devices at once.

According to some embodiments, push notifications may be used to propagate the request to activate/deactivate silent operation mode from one user device to other user devices. The use of push notifications may also be used to convey additional instructions on how the remote devices should actually achieve the silent operation mode and whether the remote user devices should report to a control server the completion of the requested action.

Control server 111 may also maintain a continuously updated view/record of which user devices of a user device group are in silent operation mode and which are not, so that the user can be offered the option to visualize the silent operation mode status of all user devices from any individual user device of the user device group.

According to some embodiments, cloud-based synchronization between user devices may be used to propagate requests to activate/deactivate the silent operation mode from one user device to other user devices of the user device group.

Operations of first user device 101a will now be discussed with reference to the flow chart of FIG. 7A and the modules of FIG. 9A according to some embodiments of inventive concepts. For example, modules of FIG. 9A may be stored in memory 609 of FIG. 6B, and these modules may provide instructions so that when the instructions of a module are executed by first user device processor, processor 601 performs respective operations of the flow chart of FIG. 7A.

As previously discussed, first user device 101a may be included in a user device group including first user device 101a and second user device 101b that share a same service identifier for a communication service. While first and second user devices 101a and 101b are discussed by way of example, any number of additional user devices (e.g., user device 101c) may also be included in the user device group. Responsive to user input regarding an operation mode at block 711, processor 601a may accept the user input through user interface 603a at block 721 (e.g., using first input acceptance module 921), and determine at block 731 if the user input is to activate or deactivate the operation mode (e.g., using determination module 931).

Responsive to accepting user input to activate the operation mode for first user device 101a at blocks 721 and 731, processor 601a may activate the operation mode at first user device 101a at block 741 (e.g., using activation module 941). Responsive to accepting user input to activate the operation mode at the first user device (101a), processor 601a may transmit a notification regarding activation of the operation mode to control server 111 that is remote from first user device 101a at block 751 (e.g., using activation notification module 951), with the notification being transmitted through communication interface 605a.

At block 761, processor 601a may provide service in accordance with activation of the operation mode (e.g., using first service provision module 961). For example, if the communication service is a voice and/or video call and the operation mode is a silent operation mode, activating the silent operation mode may include disabling audible alerts for calls to first user device 101a. Accordingly, providing service at block 761 may include receiving a voice and/or video call at first user device 101a without providing an audible alert.

Upon activating the operation mode, processor may return to block 711 until further user input is provided. After activating the operation mode as discussed above and responsive to user input regarding an operation mode at block 711, processor 601a may accept the user input through user interface 603a at block 721 (e.g. using first input acceptance module 921), and determine at block 731 if the user input is to activate or deactivate the operation mode (e.g. using determination module 931). Responsive to accepting the user input to deactivate the operation mode at the first user device 101a at blocks 721 and 731, processor 601a may deactivate the operation mode at the first user device 101a at block 771 (e.g., using deactivation module 971). Responsive to accepting the user input to deactivate the operation mode at the first user device (101a), processor 601a may also transmit a notification regarding deactivation of the operation mode through communication interface 605a to control server 111 that is remote from first user device 101a at block 781 (e.g., using deactivation notification module 981).

At block 791, processor 601a may provide service in accordance with deactivation of the operation mode (e.g., using second service provision module 991). For example, if the communication service is a voice and/or video call and the operation mode is a silent operation mode, deactivating the silent operation mode may include enabling audible alerts for calls to first user device 101a. Accordingly, providing service at block 791 may include providing an audible alert when receiving a voice and/or video call at first user device 101a.

Figure 9A:
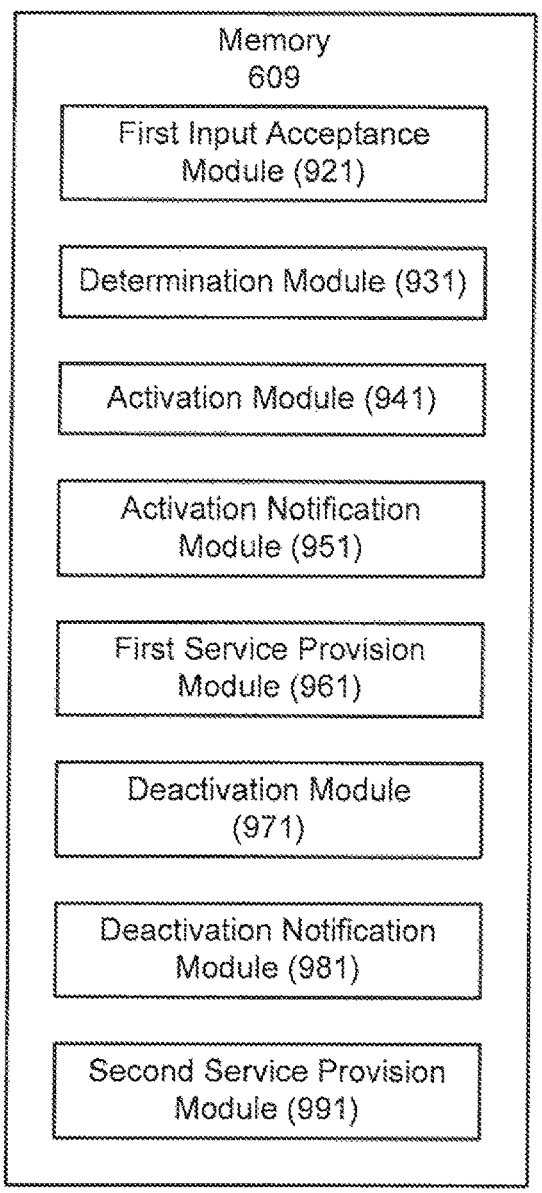

Various operations of FIG. 7A and/or modules of FIG. 9A may be optional with respect to some embodiments. Regarding methods of example embodiment 1 (set forth below), for example, operations of blocks 711, 731, 761, 771, 781, and 791 of FIG. 7A may be optional, and regarding related user devices, modules 931, 961, 971, 981, and 991 of FIG. 9A may be optional.

Operations of first user device 101a will now be discussed with reference to the flow chart of FIG. 7B and the modules of FIG. 9B according to some other embodiments of inventive concepts. For example, modules of FIG. 9B may be stored in memory 609 of FIG. 6B, and these modules may provide instructions so that when the instructions of a module are executed by first user device processor 601, processor 601 performs respective operations of the flow chart of FIG. 7B.

Figure 9B:
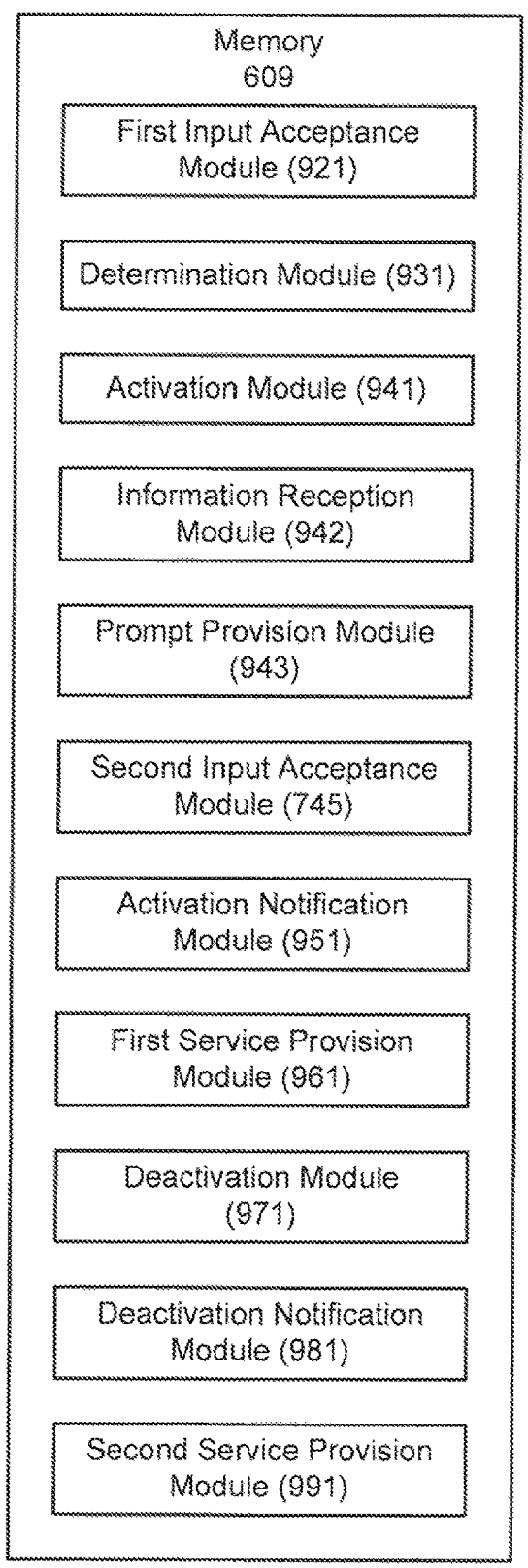

Operations of first user device 101a are illustrated in the flow chart of FIG. 7B and related modules are illustrated in FIG. 9B according to some other embodiments of inventive concepts. In FIG. 7B, operations of blocks 711, 721, 731, 741, 751, 761, 771, 781, and 791 may be the same as and/or similar to operations of blocks having the same reference number discussed above with respect to FIG. 7A, and further discussion may thus be omitted and/or abbreviated. Similarly, in FIG. 9B, modules 921, 931, 941, 951, 961, 971, 981, and 991 may be the same as and/or similar to modules having the same reference number discussed above with respect to FIG. 9A, and further discussion may thus be omitted and/or abbreviated. Accordingly, discussion of FIG. 7B will focus on operations of blocks 743, 745, and 747, and discussion of FIG. 9B will focus on modules 943 and 945.

Responsive to accepting user input to activate the operation mode at blocks 711, 721, and 731 (e.g., using modules 911, 921, and 931), processor 601a may provide a prompt at block 743 through user interface 603a for user input regarding activation of the operation mode at second user device 101b and/or third user device 101c of the user device group (e.g., using prompt provision module 943). At block 745, processor 601a may accept user input regarding activation of the operation mode at second user device 101b and/or third user device 101c of the user device group (e.g., using second input acceptance module 945). Responsive to accepting user input to activate the operation mode at one or more other devices of the user device group at block 747, processor 601a may transmitting the notification regarding activation at block 751 and provide service in accordance with the activation mode at block 761 (e.g., using activation notification module 951 and first service provision module 961). Responsive to accepting user input to not activate the operation mode at any other devices of the user device group at block 747, processor 601a may provide service in accordance with the activation mode at block 761 (e.g., using first service provision module 961) without transmitting a notification regarding activation at block 751.

According to some embodiments, the user device group may include first user device 101a, second user device 101b, and third user device 101c all sharing the same service identifier for a communication service, and the prompt of block 743 may be a single prompt to activate the operation mode at all user devices of the user device group (e.g., at second and third user devices 101b and 101c). Responsive to accepting user input to activate the operation mode using such a prompt, the notification of block 751 may indicate activation of the operation mode at all user devices of the user device group (e.g., at second and third user devices 101b and 101c of the user device group).

According to some other embodiments, the user device group may include first user device 101a, second user device 101b, and third user device 101c all sharing the service identifier for the communication service, and the prompt of block 743 may include a first prompt to activate the operation mode for second user device 101b and a second prompt to activate the operation mode for third user device 101c. Accordingly, user input may be selective with respect to other user devices of the user device group. For example, operations 745 and 747 may include accepting user input for second user device 101b without accepting user input for third user device 101c, and transmitting the notification at block 751 may include transmitting the notification requesting activation of the operation mode for second user device 101b without requesting activation of the operation mode for the third communication device 101c. If no other user device of the user device group is selected responsive to such a prompt, processor 601a may provide service in accordance with the activation mode at block 761 without transmitting a notification regarding activation at block 751.

As further shown in FIG. 7B and FIG. 9B, processor 601a may receive information regarding the user device group (e.g., regarding second user device 101b and the third user device 101c) through communication interface 605a from control server 111 at block 742 (e.g., using information reception module 942) before providing the prompt at block 743 including the first prompt for the second user device 101b and the second prompt for the third user device 101c. Accordingly, the prompt of block 743 may be provided responsive to receiving the information regarding the second and third user devices at block 742. For example, processor 601a may transmit an initial notification to control server 111 responsive to user input to activate the operation mode, and control server 111 may reply with the information of block 742. Operations of block 742 may be omitted if devices of the user device group are already known to the user device or if selective prompts for different devices of the user device group are not provided (e.g., if a single prompt is provided to activate the operation mode for all user devices of the user device group as discussed above).

Various operations of FIG. 7B and/or modules of FIG. 9B may be optional with respect to some embodiments. Regarding methods of example embodiment 1 (set forth below), for example, operations of blocks 711, 731, 742, 743, 745, 747, 761, 771, 781, and 791 of FIG. 7B may be optional, and regarding related user devices, modules 931, 942, 943, 945, 961, 971, 981, and 991 of FIG. 9B may be optional.

Operations of control server 122 will now be discussed with reference to the flow chart of FIG. 8 and the modules of FIG. 10 according to some other embodiments of inventive concepts. For example, modules of FIG. 10 may be stored in memory 657 of FIG. 6C, and these modules may provide instructions so that when the instructions of a module are executed by control server processor 653, processor 653 performs respective operations of the flow chart of FIG. 8.

Figure 8:
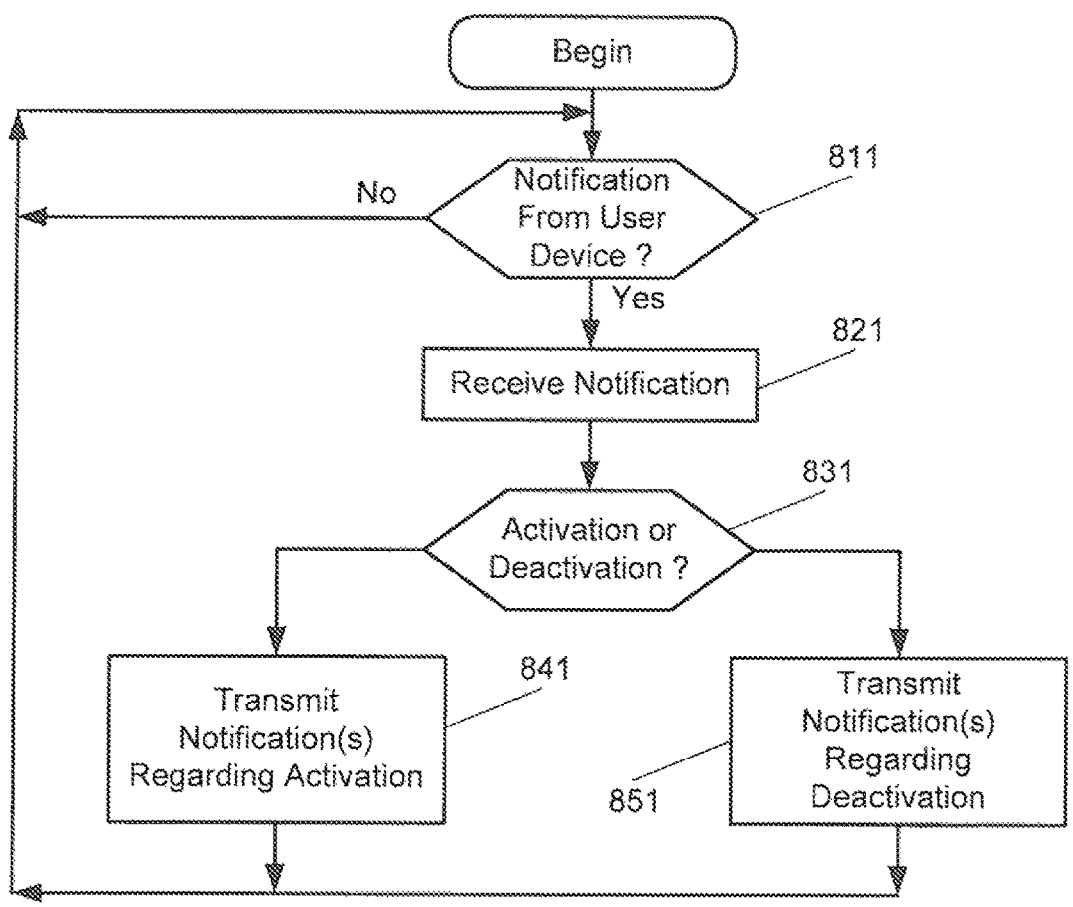
FIG. 8 is a flow diagram illustrating operations of a control server and FIG. 10 is a related module diagram according to some embodiments of inventive concepts.

Operations of control server 111 are illustrated in the flow chart of FIG. 8 according to some embodiments of inventive concepts. As discussed above, control server 111 may provide service for a user device group including first user device 101a, second user device 101b, and third user device 101c sharing a same service identifier for a communication service. Responsive to a notification from user device 101a at block 811, processor 653 at block 821 may receive the notification through network interface 655 from first user device 101a (e.g., using notification reception module 1021). Responsive the first notification being a notification regarding activation of an operation mode (e.g., a notification as discussed above with respect to operation 751 of FIGS. 7A and 7B) at block 831, processor 655 at block 841 may transmit a notification through network interface 655 to second user device 101*b* regarding activation of the operation mode for the second user device 101*b* (e.g., using first notification transmission module 1041).

According to some embodiments, if the user device group includes first, second, and third user devices 101*a*, 101*b*, and 101*c*, operations of block 841 may include transmitting notifications regarding activation of the operation mode at both of second and third user devices 101*b* and 101*c* of the user device group. For example, a notification from user device 101*a* at block 821 may apply to all user devices of the user device group as discussed above with respect to operation 751 of FIG. 7A.

According to some other embodiments, if the user device group includes first, second, and third user devices 101*a*, 101*b*, and 101*c*, operations of block 841 may include transmitting a notification indicating activation of the operation mode for second user device 101*b* without requesting activation of the operation mode for third communication device 101*c*, and without transmitting a notification to third user device 101*c*. For example, the notification from first user device 101*a* may be provide as discussed above with respect to operations 742, 743, 745, 747, and 751 of FIG. 7B. Accordingly to such embodiments, processor 655 may also transmit information regarding second user device 101*b* and the third user device 101*c* to first user device 101*a* before receiving the notification from first user device 101*a*, for example, as discussed above with respect to block 742 of FIG. 7B.

After transmitting the notification(s) of block 841, processor may return to block 811 until another notification is received from a user device. Responsive to receiving a notification from first user device 101*a* through network interface 655 regarding deactivation of the operation mode at first user device 101*a* at blocks 811, 821, and 831, processor 655 may transmit a notification through network interface to second user device 101*b* and/or third user device 101*c* regarding deactivation of the operation mode for the second user device 101*b* and/or third user device 101*c* at block 851 (e.g., using second notification transmission module 1051).

Figure 10:
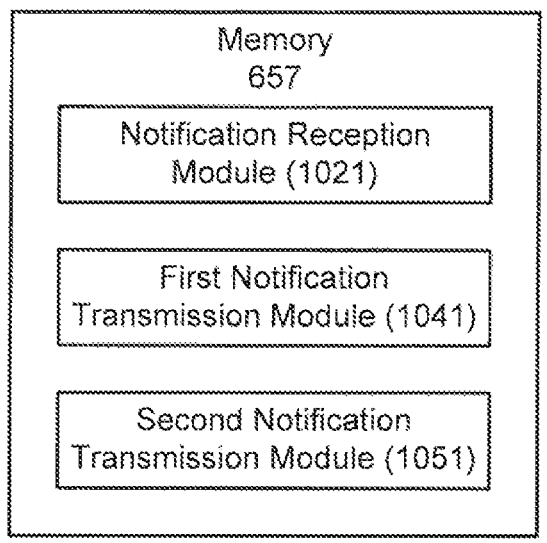

Various operations of FIG. 8 and/or modules of FIG. 10 may be optional with respect to some embodiments. Regarding methods of example embodiment 17 (set forth below), for example, operations of blocks 811, 831, and 851 of FIG. 8 may be optional, and regarding related control servers, module 1051 of FIG. 10 may be optional.

Abbreviations

| Abbreviation | Explanation |
| --- | --- |
| IMS | IP Multimedia Subsystem |
| IP | Internet Protocol |
| ISDN | Integrated Services Digital Network |
| MSISDN | Mobile Subscriber ISDN Number |
| SIM | Subscriber Identity Module |
| APNS | Apple Push Notification Service |
| GCM | Google Cloud Messaging |
| WNS | Windows Push Notification Service |

EXAMPLE EMBODIMENTS

Embodiment 1

A method of operating a first user device (101*a*) included in a user device group including the first user device (101*a*) and a second user device (101*b*) that share a same service identifier for a communication service, the method comprising: accepting user input at the first user device (101*a*) to activate an operation mode for the first user device (101*a*); responsive to accepting the user input to activate the operation mode at the first user device (101*a*), activating the operation mode at the first user device (101*a*); and responsive to accepting the user input to activate the operation mode at the first user device (101*a*), transmitting a notification regarding activation of the operation mode to a control server (111) that is remote from the first user device (101*a*).

Embodiment 2

The method of Embodiment 1 wherein the operation mode is a silent operation mode, and wherein activating the silent operation mode comprises disabling audible alerts for the first user device (101*a*), enabling a do not disturb mode for the first user device (101*a*), and/or de-registering the first user device (101*a*) from an IP multimedia subsystem core.

Embodiment 3

The method of any of Embodiments 1-2 further comprising: after activating the operation mode, accepting user input at the first user device (101*a*) to deactivate the operation mode for the first user device (101*a*); responsive to accepting the user input to deactivate the operation mode at the first user device (101*a*), deactivating the operation mode at the first user device (101*a*); and responsive to accepting the user input to deactivate the operation mode at the first user device (101*a*), transmitting a notification regarding deactivation of the operation mode to the control server (111) that is remote from the first user device (101*a*).

Embodiment 4

The method of any of Embodiments 1-3 further comprising: responsive to accepting the user input to activate the operation mode, providing a prompt for user input regarding activation of the operation mode at the second user device (101*b*) of the user device group; and accepting user input to activate the operation mode at the second user device (101*b*) of the user device group; wherein transmitting the notification regarding activation comprises transmitting the notification regarding activation responsive to accepting the user input to activate the operation mode at the first user device (101*a*) and responsive to accepting the user input to activate the operation mode at the second user device (101*b*).

Embodiment 5

The method of Embodiment 4, wherein the user device group includes the first user device (101*a*), the second user device (101*b*), and a third user device (101*c*) all sharing the service identifier for the communication service, wherein the prompt is a single prompt to activate the operation mode at the second and third user devices of the user device group, and wherein transmitting the notification comprises transmitting the notification to indicate activation of the operation mode at the second and third user devices of the user device group.

Embodiment 6

The method of Embodiment 4, wherein the user device group includes the first user device (101*a*), the second user device (101b), and a third user device (101c) all sharing the service identifier for the communication service, wherein the prompt includes a first prompt to activate the operation mode for the second user device (101b) and a second prompt to activate the operation mode for the third user device (101c), wherein accepting user input to activate the operation mode at the second user device (101b) comprises accepting user input for the second user device (101b) without accepting user input for the third user device (101c), and wherein transmitting the notification comprises transmitting the notification requesting activation of the operation mode for the second user device (101b) without requesting activation of the operation mode for the third communication device (101c).

Embodiment 7

The method of Embodiment 6 further comprising: before providing the prompt including the first prompt for the second user device (101b) and the second prompt for the third user device (101c), receiving information regarding the second user device (101b) and the third user device (101c) from the control server (111), wherein providing the prompt including the first prompt and the second prompt comprises providing the first and second prompts responsive to receiving the information regarding the second and third user devices.

Embodiment 8

The method of any of Embodiments 1-7 wherein transmitting the notification comprises transmitting the notification to the control server (111) as part of a synchronization service.

Embodiment 9

The method of Embodiment 8 wherein activating the operation mode includes setting a flag to an activation state, and wherein transmitting the notification as part of the synchronization service comprises propagating the flag in the activation state through the control server (111) to the second user device (111b) of the user device group.

Embodiment 10

The method of any of Embodiments 1-9 wherein the service identifier comprises at least one of a Mobile Subscriber Integrated Services Digital Network Number (MSISDN) and/or a email address.

Embodiment 11

The method of any of Embodiments 1-10, wherein the communication service comprises at least one of a voice and/or video call.

Embodiment 12

The method of Embodiments 11, wherein the operation mode is a silent operation mode, the method further comprising: after activating the silent operation mode, receiving a voice and/or video call at the first user device without providing an audible alert.

Embodiment 13

The method of Embodiment 12, wherein receiving the voice and/or video call comprises receiving a first voice and/or video call, the method further comprising: after activating the silent operation mode and after accepting the first voice and/or video call, accepting user input at the first user device (101a) to deactivate the silent operation mode for the first user device (101a); responsive to accepting the user input to deactivate the silent operation mode at the first user device (101a), deactivating the silent operation mode at the first user device (101a); responsive to accepting the user input to deactivate the silent operation mode at the first user device (101a), transmitting a notification regarding deactivation of the silent operation mode to the control server (111) that is remote from the first user device (101a); and after deactivating the silent operation mode, providing an audible alert at the first user device for a second voice and/or video call received at the first user device.

Embodiment 14

The method of any of Embodiments 1 and 3-11, wherein the operation mode comprises at least one of a silent operation mode, a call forwarding operation mode, and/or an alarm clock operation mode.

Embodiment 15

A first user device (101a) of a user device group including the first user device and a second user device that share a same service identifier for a communication service, the first user device comprising: a communication interface (605a) configured to provide communications over a network (121); a user interface (603a) configured to accept user input from a user of the first user device; and a processor (601a) coupled with the communication interface (605a) and the user interface (603a), wherein the processor is configured to transmit communications through the communication interface to the network and to receive communications through the communication interface from the network, wherein the processor is configured to receive user input accepted through the user interface, and wherein the processor is configured to perform operations according to any of Embodiments 1-14.

Embodiment 16

A first user device (101a) of a user device group including the first user device and a second user device that share a same service identifier for a communication service, wherein the first user device is adapted to perform according to any of Embodiments 1-14.

Embodiment 17

A method of operating a control server (111) providing service for a user device group including a first user device (101a) and a second user device (101b) sharing a same service identifier for a communication service, wherein the first user device and the second user device are remote from the control server, the method comprising: receiving a first notification from the first user device (101a) regarding activation of an operation mode at the first user device (101a); and responsive to receiving the first notification from the first user device, transmitting a second notification to the second user device (101b) regarding activation of the operation mode for the second user device (101b).

Embodiment 18

The method of Embodiment 17 wherein the operation mode is a silent operation mode to disable audible alerts for the first user device (101a), to enable a do not disturb mode for the first user device (101a), and/or to de-register the first user device (101a) from an IP multimedia subsystem core.

Embodiment 19

The method of any of Embodiments 17-18, wherein the user device group includes the first user device (101a), the second user device (101b), and a third user device (101c) all sharing the service identifier for the communication service, the method further comprising: responsive to receiving the first notification, transmitting a third notification regarding activation of the operation mode at the third user device of the user device group.

Embodiment 20

The method of any of Embodiments 17-18, wherein the user device group includes the first user device (101a), the second user device (101b), and a third user device (101c) all sharing the service identifier for the communication service, wherein the first notification indicates activation of the operation mode for the second user device without requesting activation of the operation mode for the third communication device, and wherein transmitting the second notification comprises transmitting the second notification to the second user device without transmitting a notification to the third user device.

Embodiment 21

The method of Embodiment 20, further comprising: before receiving the first notification from the first user device, transmitting information regarding the second user device (101b) and the third user device (101c) to the first user device.

Embodiment 22

The method of any of Embodiments 17-21 wherein receiving the first notification comprises receiving the first notification from the first user device as part of a synchronization service for the user device group, and wherein transmitting the second notification comprises transmitting the second notification to the second user device as a part of the synchronization service for the user device group.

Embodiment 23

The method of Embodiment 22 wherein the first notification includes a flag indicating an activation state, and wherein the second notification includes the flag indication the activation state.

Embodiment 24

The method of any of Embodiments 17-23 wherein the service identifier comprises at least one of a Mobile Subscriber Integrated Services Digital Network Number (MSISDN) and/or a email address.

Embodiment 25

The method of any of Embodiments 17-24, wherein the communication service comprises at least one of a voice and/or video call.

Embodiment 26

The method of any of Embodiments 17-25 further comprising: after transmitting the second notification, receiving a third notification from the first user device regarding deactivation of the operation mode at the first user device (101a); and responsive to receiving the third notification from the first user device, transmitting a fourth notification to the second user device (101b) regarding deactivation of the operation mode for the second user device (101b).

Embodiment 27

The method of any of Embodiments 17 and 19-26, wherein the operation mode comprises at least one of a silent operation mode, a call forwarding operation mode, and/or an alarm clock operation mode.

Embodiment 28

A control server (111) providing service for a user device group including a first user device and a second user device that share a same service identifier for a communication service, the control server comprising: a network interface (655) configured to provide communications over a network (121); and a processor (655) coupled with the network interface, wherein the processor is configured to transmit and receive communications over the network through the network interface, and wherein the processor is configured to perform operations according to any of Embodiments 17-27.

Embodiment 29

A control server (111) providing service for a user device group including a first user device and a second user device that share a same service identifier for a communication service, wherein the control server is adapted to perform according to any of Embodiments 17-27.

Further Definitions

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a first user device, included in a user device group including the first user device and a second user device that share a same service identifier for a communication service, the method comprising:
   accepting user input at the first user device to activate an operation mode for the first user device;
   responsive to accepting the user input to activate the operation mode at the first user device, activating the operation mode at the first user device; and
   responsive to accepting the user input to activate the operation mode at the first user device, transmitting a notification regarding activation of the operation mode to a control server that is remote from the first user device; and
wherein the method further comprises:
   after activating the operation mode, accepting user input at the first user device to deactivate the operation mode for the first user device;
   responsive to accepting the user input to deactivate the operation mode at the first user device, deactivating the operation mode at the first user device; and
   responsive to accepting the user input to deactivate the operation mode at the first user device, transmitting a notification regarding deactivation of the operation mode to the control server that is remote from the first user device.

2. The method of claim 1, wherein the operation mode is a silent operation mode, and wherein activating the silent operation mode comprises one or more of: disabling audible alerts for the first user device; enabling a do not disturb mode for the first user device; and de-registering the first user device from an Internet Protocol (IP) multimedia subsystem core.

3. A first user device of a user device group including the first user device and a second user device that share a same service identifier for a communication service, the first user device comprising:
   a communication interface configured to provide communications over a network;
   a user interface configured to accept user input from a user of the first user device; and
   a processor coupled with the communication interface and the user interface, wherein the processor is configured to transmit communications through the communication interface to the network and to receive communications through the communication interface from the network, and wherein the processor is configured to receive user input accepted through the user interface, and wherein the processor is configured to:
      accept user input at the first user device to activate an operation mode for the first user device;
      activate the operation mode at the first user device responsive to accepting the user input to activate the operation mode at the first user device; and
      transmit a notification regarding activation of the operation mode to a control server that is remote from the first user device, responsive to accepting the user input to activate the operation mode at the first user device;
   wherein the processor is further configured to:
      provide a prompt for user input regarding activation of the operation mode at the second user device of the user device group, responsive to accepting the user input to activate the operation mode;
      accept user input to activate the operation mode at the second user device of the user device group; and
      transmit the notification regarding activation by transmitting the notification regarding activation responsive to accepting the user input to activate the operation mode at the first user device and responsive to accepting the user input to activate the operation mode at the second user device.

4. The first user device of claim 3, wherein the operation mode is a silent operation mode, and wherein the processor is configured to activate the silent operation mode by one or more of: disabling audible alerts for the first user device; enabling a do not disturb mode for the first user device; and de-registering the first user device from an Internet Protocol (IP) multimedia subsystem core.

5. The first user device of claim 3, wherein the processor is further configured to:
   accept user input at the first user device to deactivate the operation mode for the first user device after activating the operation mode;
   deactivate the operation mode at the first user device, responsive to accepting the user input to deactivate the operation mode at the first user device; and
   transmit a notification regarding deactivation of the operation mode to the control server that is remote from the first user device, responsive to accepting the user input to deactivate the operation mode at the first user device.

6. The first user device of claim 3, wherein the user device group includes the first user device, the second user device, and a third user device all sharing the service identifier for the communication service, wherein the prompt is a single prompt to activate the operation mode at the second and third user devices of the user device group, and wherein the processor is configured to transmit the notification by transmitting the notification to indicate activation of the operation mode at the second and third user devices of the user device group.

7. The first user device of claim 3,
   wherein the user device group includes the first user device, the second user device, and a third user device all sharing the service identifier for the communication service,
   wherein the prompt includes a first prompt to activate the operation mode for the second user device and a second prompt to activate the operation mode for the third user device,
   wherein the processor is configured to accept user input to activate the operation mode at the second user device by accepting user input for the second user device without accepting user input for the third user device, and
   wherein the processor is configured to transmit the notification by transmitting the notification requesting activation of the operation mode for the second user device without requesting activation of the operation mode for the third communication device.

8. The first user device of claim 7, wherein the processor is further configured to:
   receive information regarding the second user device and the third user device from the control server before providing the prompt including the first prompt for the second user device and the second prompt for the third user device; and
   provide the prompt including the first prompt and the second prompt by providing the first and second prompts responsive to receiving the information regarding the second and third user devices.

9. The first user device of claim 3, wherein the processor is configured to transmit the notification by transmitting the notification to the control server as part of a synchronization service.

10. A method of operating a control server that provides service for a user device group that includes a first user device and a second user device sharing a same service identifier for a communication service, wherein the first user device and the second user device are remote from the control server, the method comprising:
   receiving a first notification from the first user device regarding activation of an operation mode at the first user device; and
   responsive to receiving the first notification from the first user device, transmitting a second notification to the second user device regarding activation of the operation mode for the second user device; and
   wherein the user device group includes the first user device, the second user device, and a third user device all sharing the service identifier for the communication service, wherein the first notification indicates activation of the operation mode for the second user device without requesting activation of the operation mode for the third communication device, and wherein the processor is configured to transmit the second notification by transmitting the second notification to the second user device without transmitting a notification to the third user device.

11. The method of claim 10, wherein the operation mode is a silent operation mode to one or more of: disable audible alerts for the first user device; enable a do not disturb mode for the first user device; and de-register the first user device from an Internet Protocol (IP) multimedia subsystem core.

12. The method of claim 10, further comprising:
responsive to receiving the first notification, transmitting a third notification regarding activation of the operation mode at the third user device of the user device group.

13. A control server configured to provide service for a user device group including a first user device and a second user device that share a same service identifier for a communication service, the control server comprising:
a network interface configured to provide communications over a network; and
a processor coupled with the network interface, wherein the processor is configured to transmit and receive communications over the network through the network interface, and wherein the processor is configured to:
receive a first notification from the first user device regarding activation of an operation mode at the first user device; and
transmit a second notification to the second user device regarding activation of the operation mode for the second user device, responsive to receiving the first notification from the first user device; and
wherein the user device group includes the first user device, the second user device, and a third user device all sharing the service identifier for the communication service, wherein the first notification indicates activation of the operation mode for the second user device without requesting activation of the operation mode for the third communication device, and wherein the processor is configured to transmit the second notification by transmitting the second notification to the second user device without transmitting a notification to the third user device.

14. The control server of claim 13, wherein the operation mode is a silent operation mode to one or more of: disable audible alerts for the first user device; enable a do not disturb mode for the first user device; and de-register the first user device from an Internet Protocol (IP) multimedia subsystem core.

15. The control server of claim 13, wherein the processor is further configured to:
transmit a third notification regarding activation of the operation mode at the third user device of the user device group, responsive to receiving the first notification.

16. The control server of claim 13, wherein the processor is further configured to:
transmit information regarding the second user device and the third user device to the first user device before receiving the first notification from the first user device.

17. The control server of claim 13, wherein the processor is configured to:
receive the first notification by receiving the first notification from the first user device as part of a synchronization service for the user device group; and
transmit the second notification by transmitting the second notification to the second user device as a part of the synchronization service for the user device group.

* * * * *